United States Patent
Patil

(10) Patent No.: US 10,816,068 B2
(45) Date of Patent: Oct. 27, 2020

(54) TORQUE CONVERTER INCLUDING STATOR AND TURBINE ASSEMBLY FOR LIMITING RADIAL MOVEMENT OF THE STATOR

(71) Applicant: Schaeffler Technologies AG & Co. KG, Herzogenaurach (DE)

(72) Inventor: Pankaj Madhukar Patil, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 15/826,586

(22) Filed: Nov. 29, 2017

(65) Prior Publication Data

US 2019/0162283 A1  May 30, 2019

(51) Int. Cl.
  *F16H 41/28* (2006.01)
  *F16H 41/24* (2006.01)
  *F16H 45/02* (2006.01)

(52) U.S. Cl.
  CPC .............. *F16H 41/28* (2013.01); *F16H 45/02* (2013.01); *F16H 2041/246* (2013.01); *F16H 2045/0278* (2013.01)

(58) Field of Classification Search
  CPC .... F16H 41/24; F16H 41/28; F16H 2041/285; F16H 2045/0205
  See application file for complete search history.

(56) References Cited

U.S. PATENT DOCUMENTS

| 5,822,987 | A | 10/1998 | Tsukamoto et al. |
| 2012/0181130 | A1 | 7/2012 | Fukunaga |
| 2015/0027110 | A1 | 1/2015 | Lindemann et al. |
| 2015/0354683 | A1* | 12/2015 | Nozawa .............. F16H 41/24 60/330 |
| 2015/0369069 | A1* | 12/2015 | Smith ................ F16H 41/04 60/330 |
| 2017/0254397 | A1 | 9/2017 | Subotic | |

FOREIGN PATENT DOCUMENTS

KR  1020110046149 A  5/2011

OTHER PUBLICATIONS

Corresponding Search Report and Written Opinion for PCT/US2018/061709.

* cited by examiner

*Primary Examiner* — Abiy Teka
(74) *Attorney, Agent, or Firm* — Davidson, Davidson & Kappel, LLC

(57) ABSTRACT

A torque converter includes a turbine including a plurality of turbine blades and an inner radial extension radially inward from the turbine blades. The torque converter also includes a stator including a plurality of stator blades and a stator body supporting the stator blades. At least one of the inner radial extension and the stator body is provided with a stator retaining assembly to limit radial movement of the stator with respect to the turbine.

20 Claims, 5 Drawing Sheets

TORQUE CONVERTER INCLUDING STATOR AND TURBINE ASSEMBLY FOR LIMITING RADIAL MOVEMENT OF THE STATOR

The present disclosure relates generally to torque converters and more specifically to stators and turbines of torque converters.

BACKGROUND

Torque converters including axially movable turbines, where the turbine forms a piston—i.e., iTC torque converter—are known. U.S. Pub. 2015/0027110 shows such an iTC torque converter.

U.S. Pub. 2017/0254397 discloses an impeller extruded for radial alignment of a stator.

SUMMARY OF THE INVENTION

A torque converter is provided that includes a turbine including a plurality of turbine blades and an inner radial extension radially inward from the turbine blades. The torque converter also includes a stator including a plurality of stator blades and a stator body supporting the stator blades. At least one of the inner radial extension and the stator body is provided with a stator retaining assembly to limit radial movement of the stator with respect to the turbine.

According to embodiments of the torque converter, the stator retaining assembly may include an axial protrusion extending into a gap formed between a turbine facing radially extending surface of the stator body and a stator facing radially extending surface of the inner radial extension. The stator body may include an axially extending surface extending from the turbine facing radially extending surface of the stator body. An axially extending surface of the axial protrusion may be arranged radially outward from the axially extending surface of the stator body to limit radial movement of the stator by contacting the axially extending surface of the stator body. A bent plate may be fixed to the inner radial extension, the bent plate including the axial protrusion. The axial protrusion may be formed integrally with the inner radial extension. The axial protrusion may include a plurality of circumferentially spaced tabs lanced from the material of the inner radial extension. The axial protrusion may include a plurality of circumferentially spaced tabs extruded from the material of the inner radial extension. The inner radial extension may include an axially extending surface extending from the stator facing radially extending surface of the inner radial extension. An axially extending surface of the axial protrusion may be arranged radially outward from the axially extending surface of the inner radial extension to limit radial movement of the stator by contacting the axially extending surface of the inner radial extension. The axial protrusion may be formed integrally with the stator body. The torque converter may include an impeller and the stator may include a brim on outer diameters of the stator blades. The stator retaining assembly may be configured to limit radial movement of the stator with respect to the turbine to prevent the brim from contacting the turbine and the impeller. The impeller includes impeller blades and an impeller core ring fixed to the impeller blades. The turbine may include a turbine core ring fixed to the turbine blades. The stator retaining assembly may be configured to limit radial movement of the stator with respect to the turbine to prevent the brim from being pinched between the impeller core ring and the turbine core ring. The impeller may include impeller blades and an impeller core ring fixed to the impeller blades. The turbine may include a turbine core ring fixed to the turbine blades. The stator retaining assembly may be configured to limit radial movement of the stator with respect to the turbine to prevent the brim from contacting the turbine core ring and the impeller core ring.

A method of constructing is also provided. The method includes providing a turbine including a plurality of turbine blades and an inner radial extension radially inward from the turbine blades; providing a stator including a plurality of stator blades and a stator body supporting the stator blades; and providing at least one of the inner radial extension and the stator body with a stator retaining assembly to limit radial movement of the stator with respect to the turbine.

According to embodiments of the method, the stator retaining assembly may include an axial protrusion extending into a gap formed between a turbine facing radially extending surface of the stator body and a stator facing radially extending surface of the inner radial extension. The stator body may include an axially extending surface extending from the turbine facing radially extending surface of the stator body. An axially extending surface of the axial protrusion may be arranged radially outward from the axially extending surface of the stator body to limit radial movement of the stator by contacting the axially extending surface of the stator body. The providing of the at least one of the inner radial extension and the stator body with the stator retaining assembly may include forming the axial protrusion on the inner radial extension. The forming of the axial protrusion on the inner radial extension may include fixing a bent plate to the inner radial extension, the bent plate including the axial protrusion. The forming of the axial protrusion on the inner radial extension may include lancing or extruding the inner radial extension to form the axial protrusion as a plurality of circumferentially spaced tabs lanced. The providing of the at least one of the inner radial extension and the stator body with the stator retaining assembly may include forming the axial protrusion on the stator body. The method may include providing an impeller including impeller blades and an impeller core ring fixed to the impeller blades. The turbine may include a turbine core ring fixed to the turbine blades. The stator may include a brim on outer diameters of the stator blades. The stator retaining assembly may be provided to limit radial movement of the stator with respect to the turbine to prevent the brim from contacting the turbine core ring and the impeller core ring.

BRIEF DESCRIPTION OF THE DRAWINGS

The present disclosure is described below by reference to the following drawings, in which:

FIG. 1b shows an enlarged view of the stator retaining assembly shown in FIG. 1a;

DETAILED DESCRIPTION

The present disclosure provides embodiments of iTC torque converters having a stator retaining assembly configured to limit radial movement of the stator. iTC designs do not have a bearing between the stator and turbine, but leave a gap between the components for turbine deflection during clutch apply. The gap allows the stator to rest on the turbine after the torque converter is assembled and until the torque converter is mounted on transmission. Due to this gap, some stators can become radially dislodged and pinched between turbine and impeller core rings during transport. The stator cannot be assembled to a transmission and the parts must be scrapped. The present disclosure provides different embodiments of stator retaining assemblies for limiting radial movement of the stator. The stator retaining assemblies may also be beneficial in non-iTC applications (i.e., where the lockup clutch is distinct from the turbine) as well. For non-iTCs with high endplay, there is an additional gap between components, which may allow the stator to move radially outwards.

Figure 1A:
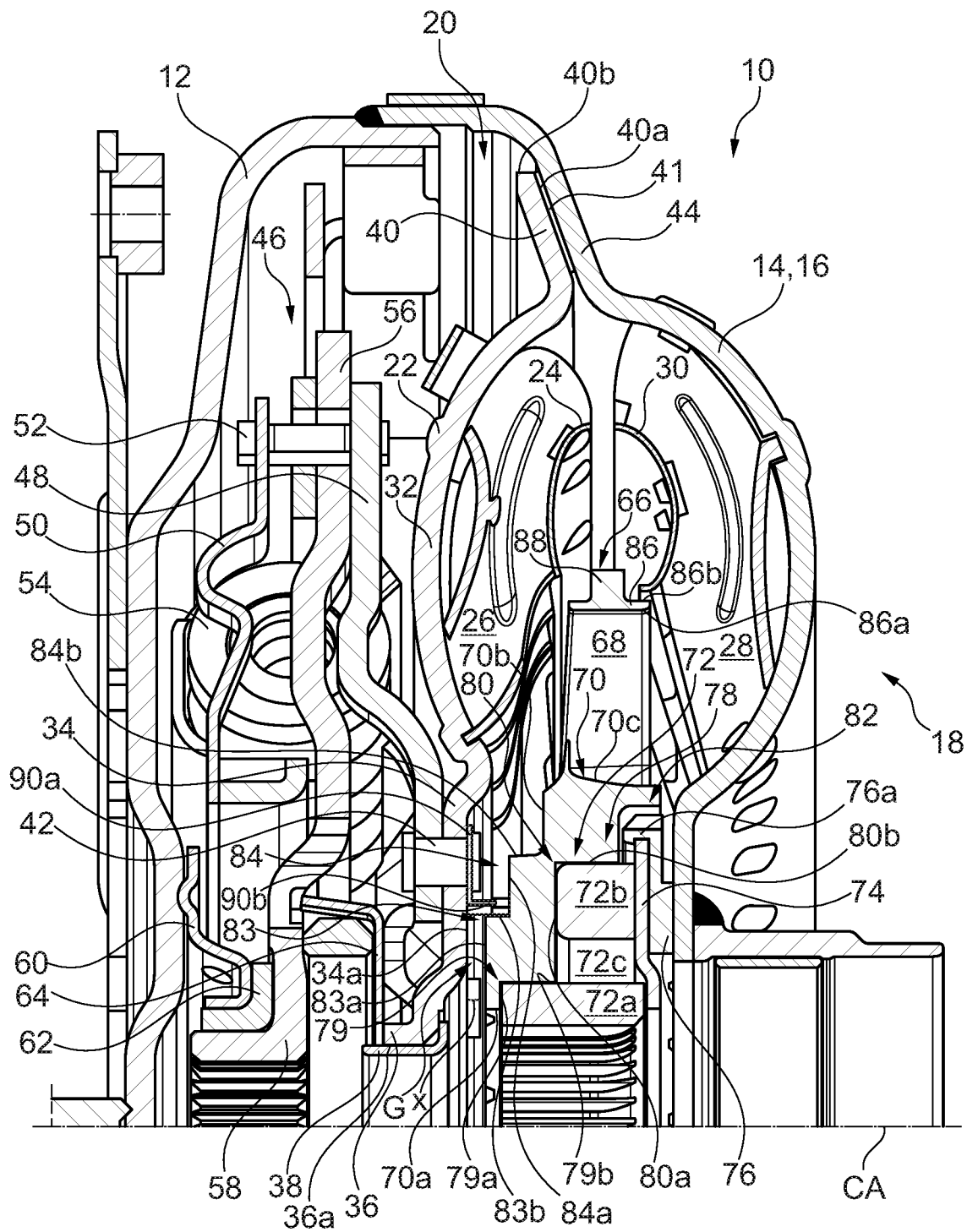
FIG. 1a shows a torque converter including a stator retaining assembly in accordance with a first embodiment of the present disclosure.

FIG. 1a shows torque converter 10 including a stator retaining assembly in accordance with a first embodiment of the present disclosure. Torque converter 10 is rotatable about a center axis CA and includes a front cover 12 for connecting to a crankshaft of an internal combustion engine and a rear cover 14 forming a shell 16 of an impeller or pump 18. The terms axially, radially and circumferentially as used herein are used with respect to center axis 11. Torque converter 10 also includes a turbine 20 configured to define a piston that is axially moveable toward and away from impeller 18 such that an engagement section of turbine 20 selectively engages and disengages an engagement section of impeller 18 so as to form a lockup clutch. Turbine 20 includes a turbine shell 22 and a core ring 24 supporting a plurality of turbine blades 26 therebetween. Impeller 18 further includes a plurality of impeller blades 28 that are held between impeller shell 16 and a core ring 30.

Turbine shell 22 includes a rounded blade supporting portion 32, which is shaped as an annular bowl, for contacting engine side edges of turbine blades 26. Radially inside of blade supporting portion 32, turbine shell 22 includes an annular inner radial extension 34 that, at an inner radial end thereof, joins an axially extending inner circumferential section 36, whose inner circumferential surface 36a contacts an outer circumferential surface of a hub bushing 38 having an L-shaped cross-section that contacts the outer circumferential surface of transmission input shaft such that turbine 20 is rotatable with respect to the transmission input shaft.

Radially outside of blade supporting portion 32 and turbine blades 26, turbine 20 includes an outer radial extension 40 protruding radially outwardly from an outer circumference of blade supporting portion 32 to define an annular protrusion having a flat annular radially extending impeller facing surface 40a and having an outermost circumference that defines an outermost circumferential surface 40b of turbine 20. Accordingly, the piston and turbine shell 22 are formed as a single piece.

A friction material 41 is bonded onto a radially extending impeller facing surface of outer radial extension 40, which forms the engagement section of turbine 20, for engaging a radially extending annular wall 44 of impeller shell 16. Radially extending wall 44 is frustoconically shaped and forms the engagement section of impeller shell 16. In other embodiments, instead of or in addition to being bonded to outer radial extension 40, friction material 41 may be bonded to radially extending turbine facing surface of radially extending wall 44 or to one or more additional discs between radially extension 40 and wall 44. Regardless of whether friction material 41 is bonded to outer radial extension 40, radially extending wall 44 or one or more additional discs, friction material 41 is provided axially between extension 40 and wall 44 to selectively rotationally engage the engagement section of turbine 20 with the engagement section of impeller shell 16. Impeller 18 drives turbine 20 via fluid flow from impeller blades 28 to turbine blades 26, when the lockup clutch is disengaged, or via friction material 41, when the lockup clutch is engaged. Turbine 20 then drives a damper assembly 46, which in turn drives the transmission input shaft.

Damper assembly 46 is fixed to turbine shell 22 by fasteners 42, which in a preferred embodiment are rivets, passing through turbine 20. More specifically, damper assembly 46 includes a first cover plate 48, which fasteners 42 pass through, and a second cover plate 50 fixed to the first cover plate 48 by a plurality of fasteners 52 that axially space cover plates 48, 50 from each other. Cover plates 48, 50 each include windows receiving circumferentially spaced springs 54 configured to allow cover plates 48, 50 to contact one circumferential end of each spring 54. Another circumferential end of each of springs 54 contacts a flange 56, which is provided axially between cover plates 48, such that cover plates 48, 50 are configured to drive flange 56 via springs 54. Flange 56 is fixed to a drive hub 58 having an inner circumferential surface that is configured for non-rotatably connecting to an outer circumferential surface of the transmission input shaft.

Damper assembly 46 further includes a centering sleeve 60 supported on the outer circumferential surface of drive hub 58 via an L-shaped bushing 62 and a biasing spring 64 supported on bushing 38 to limit the movement of turbine 20 axially away from a stator 66. Centering sleeve 60 axially abuts an inner surface of front cover 12 and axially abuts drive hub 58 via bushing 62. Biasing spring 64 axially abuts flange 56 and turbine 20.

Stator 66 is positioned axially between turbine 20 and impeller 18 to redirect fluid flowing from the turbine blades 26 before the fluid reaches impeller blades 28 to increase the efficiency of torque converter 10. Stator 66 includes a stator casting including a plurality of blades 68 for redirecting the fluid and a stator body 70. Stator 66 also includes a one-way clutch 72 held within stator body 70 by a centering plate 74. Stator 66 is configured for connecting to a stator shaft via one-way clutch 72 for rotation in one rotational direction about center axis 11. An axial thrust washer 76, which is axially between stator 66 and impeller 18, is fixed to stator 66 at an outer circumference of centering plate 74. One-way clutch 72 includes an inner race 72a configured for connecting to the stator shaft, an outer race 72b and an intermediate section 72c formed by rollers and springs radially between inner race 72a and outer race 72b. Stator body 70 is rotationally fixed to outer race 72b, and depending on the operating conditions of torque converter 10, inner race 72a and outer race 72b are rotationally fixed to each other or rotatable relative to each other.

Stator body 70 includes an annular recess 78 formed in an impeller-side thereof receiving one-way clutch 72. Annular recess 78 is defined by two step portions—a radially inner step portion 79 receiving inner race 72a and a radially outer step portion 80 receiving outer race 72b and intermediate section 72c. Radially inner step portion 79 includes a radially extending surface 79a extending radially outward from an innermost circumferential surface 70a of stator body 70 and an axially extending circumferential surface 79b extending from a radially outer edge of radially extending surface 79a. Radially outer step portion 80 includes a radially extending surface 80a extending radially outward from axially extending circumferential surface 79b of step portion 79 and an axially extending circumferential surface 80b extending from a radially outer edge of radially extending surface 80a. Axially extending circumferential surface 80b is provided with a plurality of circumferentially spaced radially extending notches 82 extending therefrom, with each of notches 82 receiving respective one of the plurality of arms 76a of thrust washer 76.

On a turbine side thereof, stator body 70 is provided with step portions 83, 84. The radially inner step portion 83 includes a radially extending surface 83a extending radially outward from innermost circumferential surface 70a of stator body 70 and an axially extending circumferential surface 83b extending from a radially outer edge of radially extending surface 83a. Radially outer step portion 84 includes a radially extending surface 84a extending radially outward from axially extending circumferential surface 83b of step portion 83 and an axially extending circumferential surface 84b extending from a radially outer edge of radially extending surface 84a. The turbine side of stator body 70 also includes a radially extending surface 70b extending radially outward from axially extending circumferential surface 84b to an outermost circumferential surface 70c of stator body 70.

Blades 68 are supported radially between outermost circumferential surface 70c of stator body 70 and an inner circumferential surface 86a of a brim 86, such that brim 86 is on outer diameters of blades 68. On an outer circumferential surface 86b of brim 86, stator 66 includes a hat 88 protruding radially outward from brim 86 to define a radially outermost edge of stator 66. An inner rim 30a of impeller core ring 30 is positioned directly radially outward of brim 86, such that radial movement of stator 66 would result in contact between brim 86 and rim 30a, allowing one or both of stator 66 and core ring 30 to be damaged and unsuitable for use. For example, contact between brim 86 and inner rim 30a may result in stator 66 getting pinched between core rings 24, 30, resulting in scraping of these parts.

There is no bearing or bushing provided between turbine 20 and stator 66, leaving a gap G having a maximum axial distance X between a stator facing radially extending surface 34a of inner radial extension 34 of turbine shell 22 and the turbine facing radially extending surface 83a of stator body 70.

In order to limit radial movement of stator 66, a stator retaining assembly in the form of a retaining plate 90 is fixed to turbine 20. Retaining plate 90 includes a base 90a for fixing plate 90 to turbine 20 and an axial protrusion 90b for limiting the radial movement of stator 66 with respect to turbine 20 by radially abutting stator body 70. Axial protrusion 90b extends away from radially extending surface 34a of inner radial extension 34 by a distance that is greater than the maximum axial distance X of gap G. Retaining plate 90 is formed as a single continuous ring or a plurality of segments spaced circumferentially about center axis 11.

Retaining plate 90 may be formed of a thin plate of 0.2 to 3 mm thick, with axial protrusion 90b being bent at angle with respect to base 90a. Retaining plate 90 is fixed to turbine 20 by fasteners 42 passing through holes in base 90a.

Figure 1B:
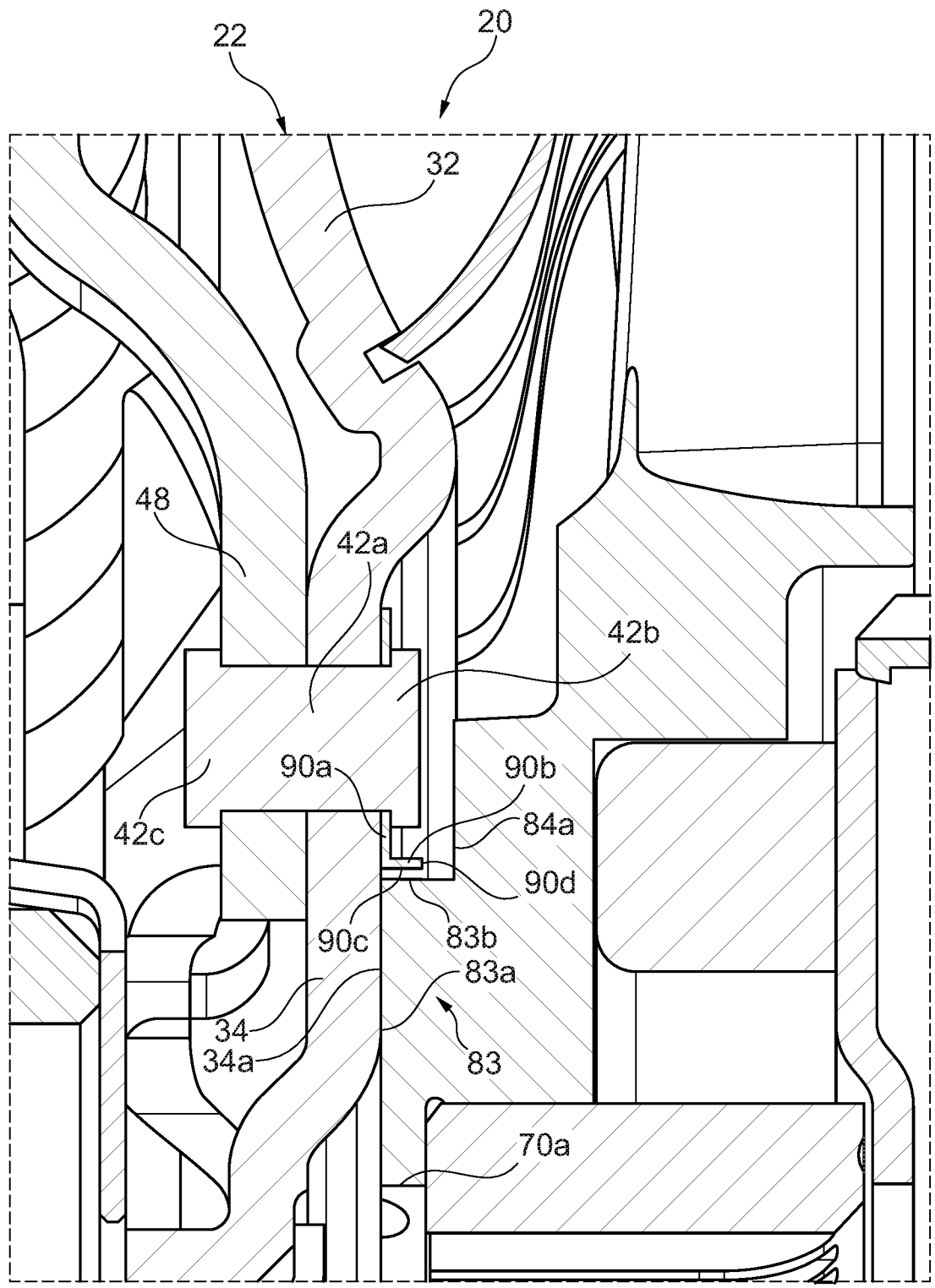

FIG. 1b shows an enlarged view of the stator retaining assembly shown in FIG. 1a. More specifically, fasteners 42 each include a shank 42a passing through one of a plurality of holes in cover plate 48, one of a plurality of holes in inner radial extension 34 and one of a plurality of holes in base 90a, a first head 42b for contacting base 90a and a second head 42c for contacting cover plate 48, such that inner radial extension 34 is sandwiched between cover plate 48 and base 90a. Base 90a rests flush against radially extending surface 34a of inner radial extension and, along with fasteners 42, is arranged radially outward from radially inner step portion 83.

Axial protrusion 90b is arranged to form a barrier to limit radial movement of stator 66 by contacting axially extending circumferential surface 83b of stator 66. A radially inner axially extending surface 90c of axial protrusion 90b is spaced radially outward from axially extending circumferential surface 83b such that protrusion 90b does not contact surface 83b of stator 66 during operation of torque converter 10, but prevents stator 66 from moving radially to prevent stator 66, in particular brim 86, from contacting core rings 24, 30 following the assembly of torque converter 10 and until the torque converter 10 is installed on the transmission. Similarly, a rear most surface 90d of axial protrusion 90b, which forms a free end of axial protrusion 90b, is spaced from radially extending surface 84a of stator body 70 such that protrusion 90b does not contact surface 84a of stator 66 during operation of torque converter 10.

Figure 2:
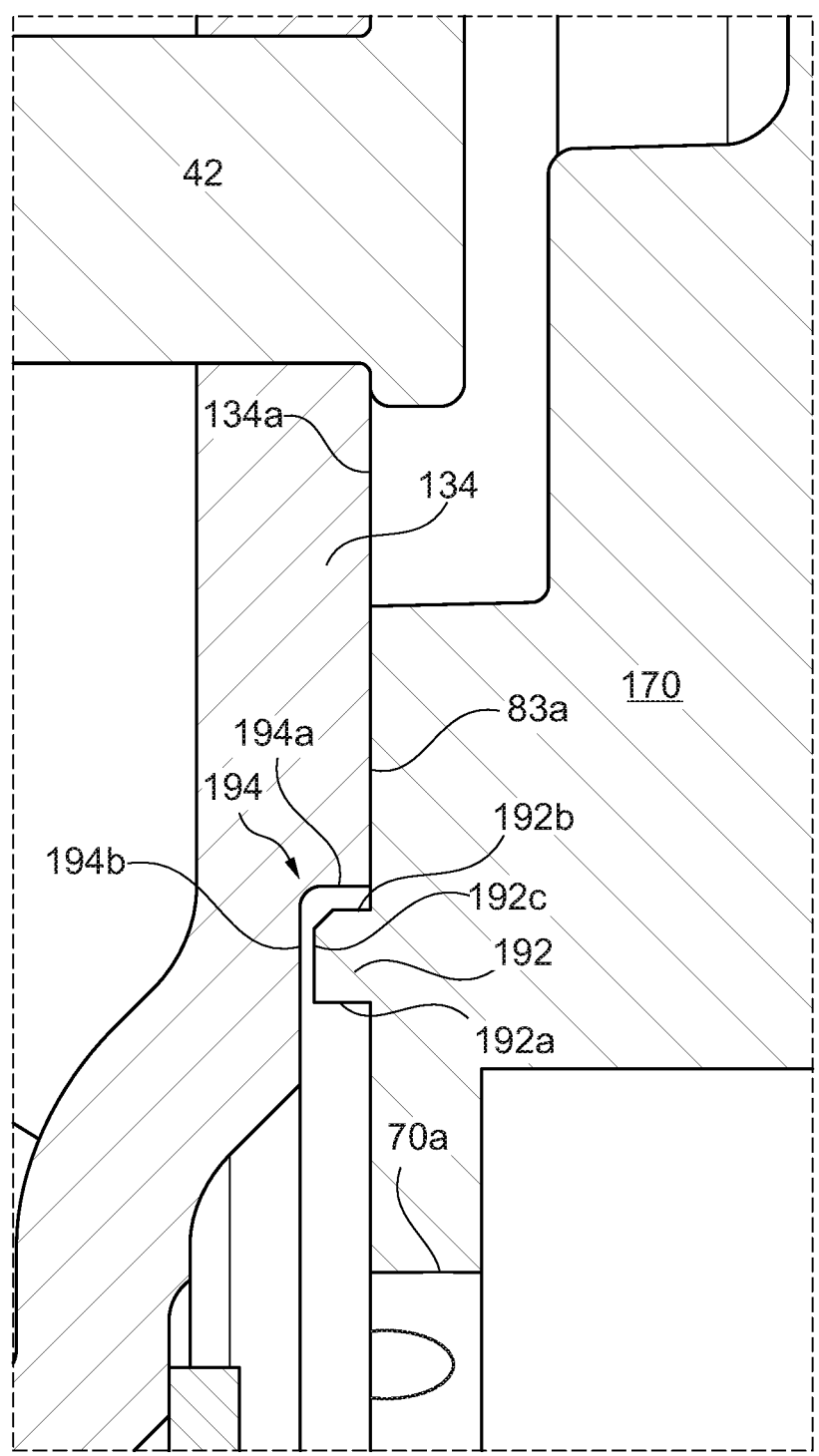
FIG. 2 shows an enlarged view of a stator retaining assembly in accordance with a second embodiment of the present disclosure.

FIG. 2 shows an enlarged view of a stator retaining assembly in accordance with a second embodiment of the present disclosure for use in a torque converter designed in the same manner as torque converter 10 shown in FIG. 1a. In this embodiment, stator body 70 is replaced with a stator body 170 and inner radial extension 34 is replaced with inner radial extension 134. Stator body 170 is configured in the same manner as stator body 70, except that an axial protrusion 192 is formed on stator body 170 protruding axially frontward from radially extending surface 83a toward turbine 20. Inner radial extension 134 is configured in the same manner as inner radial extension 34, except that a groove 194 configured for receiving axial protrusion 192 is formed in inner radial extension 134.

Axial protrusion 192 may be in the form of a continuous ring or a plurality of circumferentially spaced segments. In the embodiment shown in FIG. 2, axial protrusion 192 is formed integrally as a single piece with stator body 170 from material of stator body 170. Protrusion 192 protrudes axially past radially extending surface 83a to form a frontmost portion of stator 66. Protrusion 192 includes a radially inner axially extending surface 192a, a radially outer axially extending surface 192b and a radially extending surface 192c extending radially outward from surface 192a to surface 192b.

Groove 194 is formed in a corresponding shape to receive axial protrusion 192 and can be shaped as a continuous ring or a plurality of circumferentially spaced segments. Groove 194 includes an axially extending surface 194a extending axially away from radially extending surface 134a and a radially extending surface 194b extending radially inward from axially extending surface 194a. In one preferred embodiment, groove 194 is formed by machining surface 134a.

Protrusion 192 and groove 194 are arranged radially inside of fasteners 42 with protrusion 192 being provided in groove 194 such that axially extending surface 194a is positioned radially outside of axially extending surface 192a. Groove 194 and protrusion 192 allow turbine shell 22 to contact stator 66 to restrict stator 66 from moving radially outward with respect to turbine 20 and prevent brim 86 of stator 66 (FIG. 1a) from contacting core rings 24, 30. More specifically, groove 194 and protrusion 192 are configured such that axially extending surface 194a of groove 194 contacts axially extending surface 192a of protrusion 192 to form a barrier to restrict stator 66 from moving radially outward with respect to turbine 20. Axial protrusion 192 extends away from radially extending surface 83a by a distance that is greater than the maximum axial distance X of gap G (FIG. 1a) such that turbine 20 and stator 66 cannot be in a spaced arranged where protrusion 192 can move radially outward without contacting radially inner extension 134 of turbine 20 at axially extending surface 194a.

Axially extending surface 194a of groove 194 is spaced radially outward from radially outer axially extending surface 192b such that protrusion 192 does not contact surface 194a during operation of torque converter 10, but prevents stator 66 from moving radially to prevent stator 66, in particular brim 86, from contacting core rings 24, 30 following the assembly of torque converter 10 and until the torque converter 10 is installed on the transmission. Similarly, radially extending surface 192c of axial protrusion 192, which forms a free end of axial protrusion 192, is spaced from radially extending surface 194b of inner radial extension 134 such that protrusion 192 does not contact surface 194b during operation of torque converter 10.

Figure 3:
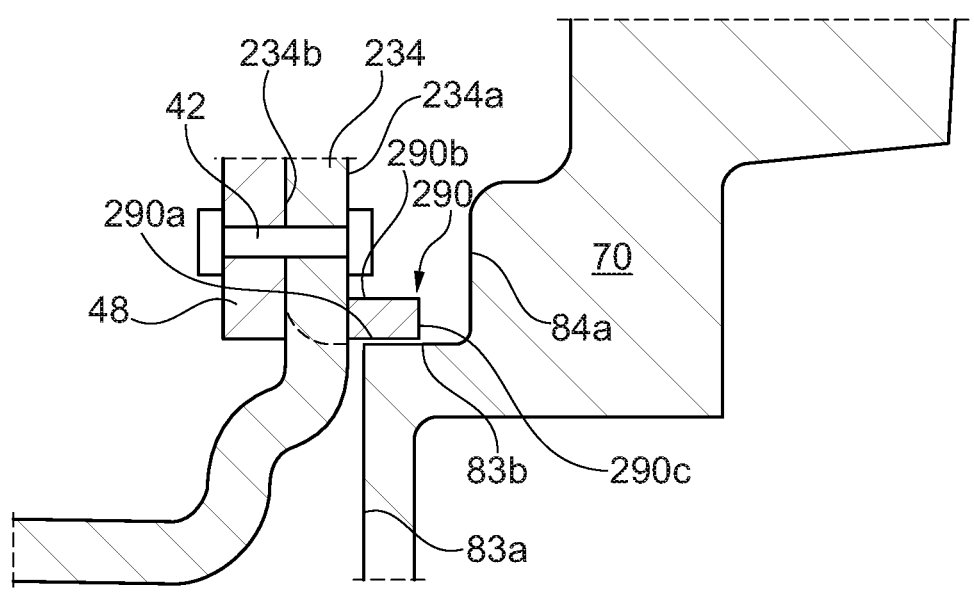
FIG. 3 shows an enlarged view of a stator retaining assembly in accordance with a third embodiment of the present disclosure.

FIG. 3 shows an enlarged view of a stator retaining assembly in accordance with a third embodiment of the present disclosure for use in a torque converter designed in the same manner as torque converter 10 shown in FIG. 1a. In this embodiment, stator body 70 is configured in the same manner as the first embodiment and inner radial extension 34 is replaced with inner radial extension 234. Inner radial extension 234 is configured in the same manner as inner radial extension 34, except that inner radial extension 234 includes an axial protrusion 290 that is lanced directly from the material of inner radial extension 234. Accordingly, axial protrusion 290 is formed integrally as a single piece with inner radial extension 234 from material of inner radial extension 234.

Axial protrusion 290 may be in the form of a plurality of circumferentially spaced tabs that are formed by contacting a front radially extending surface 234b of inner radial extension 234 with a lancing tool to separate edges of the tabs from surfaces 234a, 234b, which in turn causes protrusion 290 to extend past the rear radially extending surface 234a of inner radial extension 234. Tabs are formed to begin at front radially extending surface 234b of inner radial extension 234 and extend past rear radially extending surface 234a. Protrusion 290 protrudes axially past rear radially extending surface 234a to form a frontmost portion of inner radial extension 234. Protrusion 290 includes a radially inner axially extending surface 290a, a radially outer axially extending surface 290b and a radially extending surface 290c extending radially outward from surface 290a to surface 290b.

Axial protrusion 290 is configured for limiting the radial movement of stator 66 with respect to turbine 20 by radially abutting stator body 70. Axial protrusion 290 extends away from radially extending surface 234a of inner radial extension 234 by a distance that is greater than the maximum axial distance X of gap G (FIG. 1a) and is arranged to form a barrier to limit radial movement of stator 66 by contacting axially extending circumferential surface 83b of stator 66. A radially inner axially extending surface 290a of axial protrusion 290 is spaced radially outward from axially extending circumferential surface 83b such that protrusion 290 does not contact surface 83b of stator 66 during operation of torque converter 10, but prevents stator 66 from moving radially to prevent stator 66, in particular brim 86, from contacting core rings 24, 30 following the assembly of torque converter 10 and until the torque converter 10 is installed on the transmission. Similarly, radially extending surface 290c of axial protrusion 290, which forms a free end of axial protrusion 290, is spaced from radially extending surface 84a of stator body 70 such that protrusion 290 does not contact surface 84a of stator 66 during operation of torque converter 10.

Figure 4A:
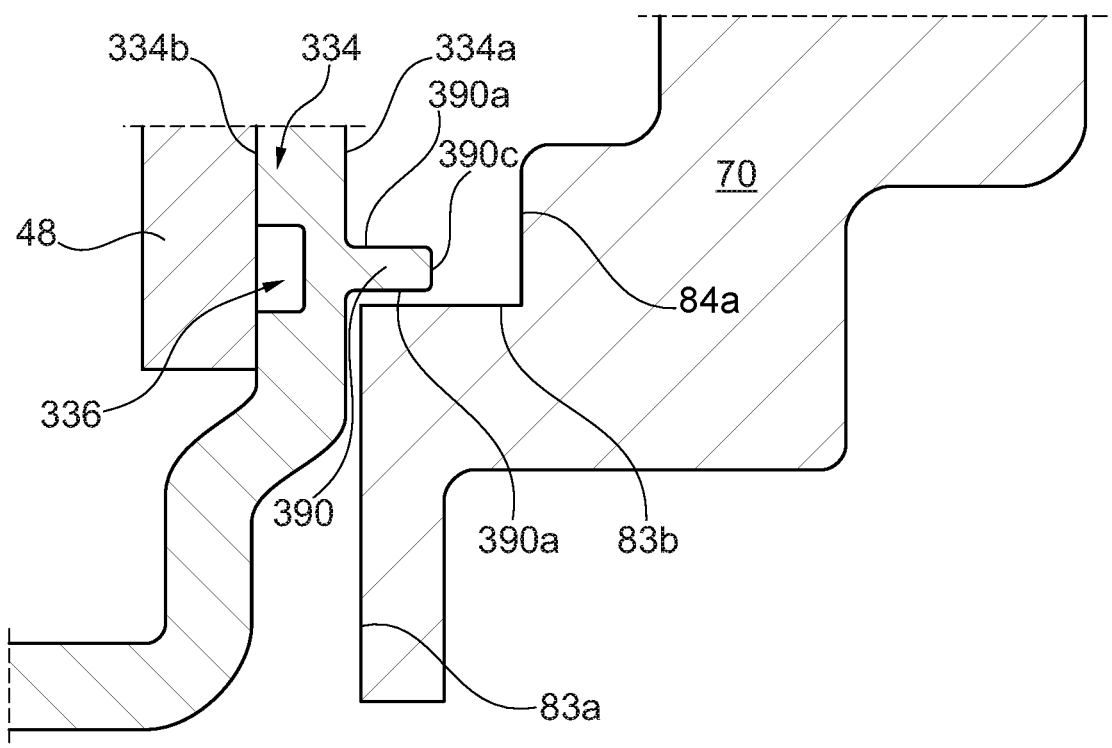
FIG. 4a shows an enlarged view of a stator retaining assembly in accordance with a fourth embodiment of the present disclosure.

FIG. 4a shows an enlarged view of a stator retaining assembly in accordance with a fourth embodiment of the present disclosure for use in a torque converter designed in the same manner as torque converter 10 shown in FIG. 1a. In this embodiment, stator body 70 is configured in the same manner as the first embodiment and inner radial extension 34 is replaced with inner radial extension 334. Inner radial extension 334 is configured in the same manner as inner radial extension 34, except that inner radial extension 334 includes an axial protrusion 390 that is extruded directly from the material of inner radial extension 334. Accordingly, axial protrusion 390 is formed integrally as a single piece with inner radial extension 334 from material of inner radial extension 334.

Axial protrusion 390 may be in the form of a plurality of circumferentially spaced tabs that are formed by contacting a front radially extending surface 334b of inner radial extension 334 with an extruding tool to form an indentation 336 in surface 34b, which in turn causes protrusion 390 to extend past a rear radially extending surface 334a of inner radial extension 334. Protrusion 390 protrudes axially past radially extending surface 334a in a manner that protrusion 390 forms a frontmost portion of inner radial extension 334. Protrusion 390 includes a radially inner axially extending surface 390a, a radially outer axially extending surface 390b and a radially extending surface 390c extending radially outward from surface 390a to surface 390b.

Axial protrusion 390 is configured for limiting the radial movement of stator 66 with respect to turbine 20 by radially abutting stator body 70. Axial protrusion 390 extends away from radially extending surface 334a of inner radial extension 334 by a distance that is greater than the maximum axial distance X of gap G (FIG. 1a) and is arranged to form a barrier to limit radial movement of stator 66 by contacting axially extending circumferential surface 83b of stator 66. Radially inner axially extending surface 390a of axial protrusion 390 is spaced radially outward from axially extending circumferential surface 83b such that protrusion 390 does not contact surface 83b of stator 66 during operation of torque converter 10, but prevents stator 66 from moving radially to prevent stator 66, in particular brim 86, from contacting core rings 24, 30 following the assembly of torque converter 10 and until the torque converter 10 is installed on the transmission. Similarly, radially extending surface 390c of axial protrusion 390, which forms a free end of axial protrusion 390, is spaced from radially extending surface 84a of stator body 70 such that protrusion 390 does not contact surface 84a of stator 66 during operation of torque converter 10.

Figure 4B:
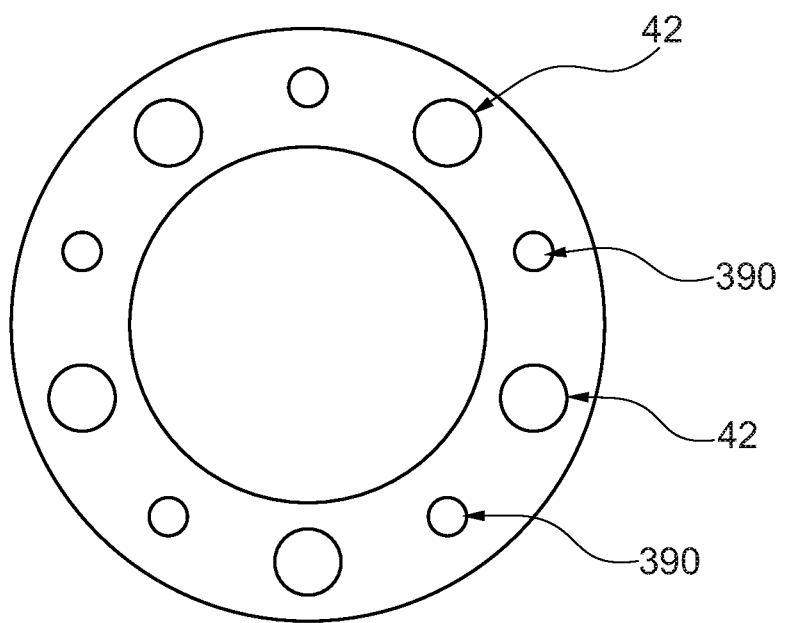
FIG. 4b schematically shows a plan view of a ring section of an inner radial extension of the stator retaining assembly extension shown in FIG. 4a that is extruded.

As shown in FIG. 4b, which schematically shows a ring section of inner radial extension 234 that is extruded, protrusions 390 are circumferentially spaced from each other so as to define an alternating pattern with fasteners 42 that fix cover plate 48 and inner radial extension 334 together. Accordingly, protrusions 390 at least partially radially overlap with fasteners 42.

In the preceding specification, the disclosure has been described with reference to specific exemplary embodiments and examples thereof. It will, however, be evident that various modifications and changes may be made thereto without departing from the broader spirit and scope of disclosure as set forth in the claims that follow. The specification and drawings are accordingly to be regarded in an illustrative manner rather than a restrictive sense.

LIST OF REFERENCE NUMERALS 10 torque converter
11 center axis
12 front cover
14 rear cover
16 impeller shell
18 impeller
20 turbine
22 turbine shell
24 turbine core ring
26 turbine blades
28 impeller blades
30 impeller core ring
30a inner rim
32 rounded blade supporting portion
34 annular inner radial extension
36 inner circumferential section
36a inner circumferential surface
38 hub bushing
40 outer radial extension
40a flat annular radially extending impeller facing surface
40b outermost circumferential surface
41 friction material
42 fasteners
42a shank
42b first head
42c second head
44 radially extending annular wall
46 damper assembly
48 first cover plate
50 second cover plate
52 fasteners
54 springs
56 drive flange
58 drive hub
60 centering sleeve
62 L-shaped bushing.
64 biasing spring
66 stator
68 stator blades
70 stator body
70a innermost circumferential surface
70b radially extending surface
70c outermost circumferential surface
72 one-way clutch
72a inner race
72b outer race
72c intermediate section
74 centering plate
76 axial thrust washer
76a arms
78 annular recess
79 rear radially inner step portion
79a radially extending surface
79b axially extending circumferential surface
80 rear radially outer step portion
80a radially extending surface
80b axially extending circumferential surface
82 notches
83 front radially inner step portion
83a radially extending surface
83b axially extending circumferential surface
84 front radially outer step portion
84a radially extending surface
84b axially extending circumferential surface
86 brim
86a inner circumferential surface
86b outer circumferential surface
88 hat
90 retaining plate
90a base
90b axial protrusion
90c radially inner axially extending surface
90d rear most surface
134 inner radial extension
134a stator side radially extending surface
170 stator body
192 axial protrusion
192a radially inner axially extending surface
192b radially outer axially extending surface
192c radially extending surface
194 groove
194a axially extending surface
194b radially extending surface
234 inner radial extension
234a rear radially extending surface
234b front radially extending surface
290 axial protrusion
290a radially inner axially extending surface
290b radially outer axially extending surface
290c radially extending surface
334 inner radial extension
334a rear radially extending surface
334b front radially extending surface
336 indentation
390 axial protrusion
390a radially inner axially extending surface
390b radially outer axially extending surface
390c radially extending surface
X distance
G gap

What is claimed is:

1. A torque converter for rotating about a center axis comprising:
a turbine including a plurality of turbine blades and an inner radial extension radially inward from the turbine blades; and
a stator including a plurality of stator blades, a stator body supporting the stator blades and a one-way clutch held within the stator body, the one-way clutch including an outer race and inner race, at least one of the inner radial extension and the stator body being provided with a stator retaining assembly to limit radial movement of the stator with respect to the turbine, the stator retaining assembly including an axial protrusion that is radially closer than an outer circumferential surface of the outer race to the center axis.

the axial protrusion being:
part of or fixed in place on the inner radial extension and arranged for radially contacting the stator body to limit radial movement of the stator with respect to the turbine, or
part of or fixd in place on the stator body and arranged for radially contacting the inner radial extension to limit radial movement of the stator with respect to the turbine.

2. The torque converter as recited in claim 1 wherein the axial protrusion extends into a gap formed between a turbine facing radially extending surface of the stator body and a stator facing radially extending surface of the inner radial extension.

3. The torque converter as recited in claim 2 wherein the stator body includes an axially extending surface extending from the turbine facing radially extending surface of the stator body, an axially extending surface of the axial protrusion being arranged radially outward from the axially extending surface of the stator body to limit radial movement of the stator by contacting the axially extending surface of the stator body.

4. The torque converter as recited in claim 3 further comprising a bent plate fixed to the inner radial extension, the bent plate including the axial protrusion.

5. The torque converter as recited in claim 4 wherein the axial protrusion is formed integrally with the inner radial extension.

6. The torque converter as recited in claim 5 wherein the axial protrusion includes a plurality of circumferentially spaced tabs lanced from a material of the inner radial extension.

7. The torque converter as recited in claim 5 wherein the axial protrusion includes a plurality of circumferentially spaced tabs extruded from a material of the inner radial extension.

8. The torque converter as recited in claim 2 wherein the inner radial extension includes an axially extending surface extending from the stator facing radially extending surface of the inner radial extension, an axially extending surface of the axial protrusion being arranged radially outward from the axially extending surface of the inner radial extension to limit radial movement of the stator by contacting the axially extending surface of the inner radial extension.

9. The torque converter as recited in claim 8 wherein the axial protrusion is formed integrally with the stator body.

10. The torque converter as recited in claim 1 further comprising an impeller, the stator including a brim on outer diameters of the stator blades, the stator retaining assembly being configured to limit radial movement of the stator with respect to the turbine to prevent the brim from contacting the turbine and the impeller.

11. The torque converter as recited in claim 10 wherein the impeller includes impeller blades and an impeller core ring fixed to the impeller blades, the turbine including a turbine core ring fixed to the turbine blades, the stator retaining assembly being configured to limit radial movement of the stator with respect to the turbine to prevent the brim from being pinched between the impeller core ring and the turbine core ring.

12. The torque converter as recited in claim 10 wherein the impeller includes impeller blades and an impeller core ring fixed to the impeller blades, the turbine including a turbine core ring fixed to the turbine blades, the stator retaining assembly being configured to limit radial movement of the stator with respect to the turbine to prevent the brim from contacting the turbine core ring and the impeller core ring.

13. A method of constructing a torque converter comprising:
providing a turbine including a plurality of turbine blades and an inner radial extension radially inward from the turbine blades;
providing a stator including a plurality of stator blades and a stator body supporting the stator blades such that no bearing or bushing is provided between the turbine and the stator, leaving a gap having a maximum axial distance between a turbine facing radially extending surface of the stator body and a stator facing radially extending surface of the inner radial extension; and
providing at least one of the inner radial extension and the stator body with a stator retaining assembly to limit radial movement of the stator with respect to the turbine, the stator retaining assembly extending axially a distance that is greater than the maximum axial distance.

14. The method as recited in claim 13 wherein the stator retaining assembly includes an axial protrusion extending into the gap formed between the turbine facing radially extending surface of the stator body and the stator facing radially extending surface of the inner radial extension.

15. The method as recited in claim 14 wherein the stator body includes an axially extending surface extending from the turbine facing radially extending surface of the stator body, an axially extending surface of the axial protrusion being arranged radially outward from the axially extending surface of the stator body to limit radial movement of the stator by contacting the axially extending surface of the stator body.

16. The method as recited in claim 14 wherein the providing of the at least one of the inner radial extension and the stator body with the stator retaining assembly includes forming the axial protrusion on the inner radial extension.

17. The method as recited in claim 16 wherein the forming of the axial protrusion on the inner radial extension includes fixing a bent plate to the inner radial extension, the bent plate including the axial protrusion.

18. The method as recited in claim 14 wherein the providing of the at least one of the inner radial extension and the stator body with the stator retaining assembly includes forming the axial protrusion on the stator body.

19. The method as recited in claim 13 further comprising providing an impeller including impeller blades and an impeller core ring fixed to the impeller blades, the turbine including a turbine core ring fixed to the turbine blades, the stator including a brim on outer diameters of the stator blades, the stator retaining assembly being provided to limit radial movement of the stator with respect to the turbine to prevent the brim from contacting the turbine core ring and the impeller core ring.

20. A method of constructing a torque converter comprising:
providing a turbine including a plurality of turbine blades and an inner radial extension radially inward from the turbine blades;
providing a stator including a plurality of stator blades and a stator body supporting the stator blades; and
providing at least one of the inner radial extension and the stator body with a stator retaining assembly to limit radial movement of the stator with respect to the turbine, wherein the stator retaining assembly includes an axial protrusion extending into a gap formed between a turbine facing radially extending surface of the stator body and a stator facing radially extending surface of the inner radial extension, wherein the providing of the at least one of the inner radial extension and the stator body with the stator retaining assembly includes forming the axial protrusion on the inner radial extension, wherein the forming of the axial protrusion on the inner radial extension includes lancing or extruding the inner radial extension to form the axial protrusion as a plurality of circumferentially spaced tabs lanced.

\* \* \* \* \*